(12) United States Patent
Nagaoka et al.

(10) Patent No.: US 6,307,542 B1
(45) Date of Patent: Oct. 23, 2001

(54) MAGNET-BASED INFORMATION INPUT APPARATUS

(75) Inventors: Makoto Nagaoka, Mitaka; Masane Nishikawa, Tokyo; Akihisa Kameari, Tokyo; Kazumi Koganezawa, Tokyo, all of (JP)

(73) Assignees: Japan Radio Co., Ltd.; Science Solutions International Laboratory, Incorporated, both of Tokyo (JP)

( * ) Notice: Subject to any disclaimer, the term of this patent is extended or adjusted under 35 U.S.C. 154(b) by 0 days.

(21) Appl. No.: 09/460,861

(22) Filed: Dec. 14, 1999

(30) Foreign Application Priority Data

May 24, 1999 (JP) ................................................. 11-144018

(51) Int. Cl.[7] ....................................................... G09G 5/00
(52) U.S. Cl. .......................................... 345/174; 178/18.07
(58) Field of Search ..................................... 345/156, 157, 345/158, 173, 174; 178/18.01–18.07, 19.01, 19.06

(56) References Cited

U.S. PATENT DOCUMENTS

| | | | |
|---|---|---|---|
| 3,846,580 | * 11/1974 | Brenner | ................................. 178/19 |
| 4,029,899 | * 6/1977 | Gordon | .................................... 341/5 |
| 4,273,954 | * 6/1981 | Takeuchi et al. | ...................... 178/19 |
| 4,631,356 | * 12/1986 | Taguchi et al. | ....................... 178/19 |

FOREIGN PATENT DOCUMENTS

| | | | |
|---|---|---|---|
| 4-295879 | | 10/1992 | (JP) . |
| 05127829 A | * | 5/1993 | (JP) . |
| 07152474 A | * | 6/1995 | (JP) . |
| 07311648 A | * | 11/1995 | (JP) . |

* cited by examiner

Primary Examiner—Regina Liang
Assistant Examiner—Alexander Eisen
(74) Attorney, Agent, or Firm—Frishauf, Holtz, Goodman, Langer & Chick, P.C.

(57) ABSTRACT

Information is inputted easily and conveniently on a writing board. A sheet member, which is provided with a map and attributed magnet-accommodating areas, is attached onto a magnetic plate provided with coils wound therearound at constant intervals in the vertical direction and in the horizontal direction to provide the writing board. Induced electromotive force-detecting sections are provided to detect the induced electromotive forces of the respective coils. When a magnet is detached, a detachment position is specified from the induced electromotive forces generated in the respective coils. When the magnet is stuck, a sticking position is specified from the induced electromotive forces generated in the respective coils. The position and the attribute are incorporated into a personal computer.

15 Claims, 11 Drawing Sheets

| COMMUNICATION TIME | PLACE OF ACCIDENT | CONTENT |
|---|---|---|
| FEBRUARY 4, 10:25 A.M. | A TOWN | FIRE |

MAGNET-BASED INFORMATION INPUT APPARATUS

BACKGROUND OF THE INVENTION

1. Field of the Invention

The present invention relates to a magnet-based information input apparatus which is preferably applied to a writing board such as a blackboard, a blueboard, and a whiteboard.

2. Description of the Related Art

A so-called electronic blackboard has been hitherto commercially available, and it is widely used as an information input apparatus, in which, for example, characters, symbols, and graphics drawn with a marker or the like on a writing board are read by means of scanning operation by using a scanning optical system such as a CCD linear sensor to obtain bitmap information so that a copy is outputted on the basis of the bitmap information.

When such an electronic blackboard is used, the characters, symbols, graphics or the like can be reproduced on a monitor of a personal computer or on a hard copy which is obtained as an output of a printer, on the basis of the bitmap information.

Another information input apparatus is also well-known. In the case of this information input apparatus, specified attribute information is previously given to a magnet by using, for example, a color or a character. For example, when such an apparatus is used in a company, information on attendance or information on destination of a company member is expressed by sticking or detaching the attributed magnet onto or from a writing board made of a magnetic material on which attendance information or destination information is depicted.

Such an information input apparatus based on the use of the magnet is easy to perform the operation, and it is convenient in that a person who sees the writing board easily understands the display contents of the information.

However, the bitmap information, which is obtained, for example, from the electronic blackboard as described above, requires a large amount of storage information, for example, even when only one character is displayed. As a result, the following problems occur. That is, the scanning optical system as described above is expensive, and hence the electronic blackboard itself is expensive. A memory unit, which is used to store the information, is expensive as well.

Further, the information input apparatus based on the use of the magnet as described above involves a problem in that the display information cannot be processed as data by using a computer.

The conventional technique, which makes it possible to process the information displayed on the magnet as data by using a computer, may be exemplified by a technique concerning "display panel provided with display magnet" as disclosed, for example, in Japanese Laid-Open Patent Publication No. 4-295879.

In this technique, a working situation table, which represents the job content, is previously depicted on a writing board which is the display panel. The writing board includes lead switches which are embedded like a grid vertically and horizontally at positions corresponding to divisions (frames) of the job content in the working situation table. A computer is connected to the respective lead switches via a controller. A bar code reader is connected to the controller. The job content represented by each of the divisions is previously stored in the computer. A name of each person and a bar code corresponding thereto are depicted on the display magnet.

Therefore, when each person sticks the display magnet onto the writing board, the bar code representing the name is firstly read by using the bar code reader. After that, the display magnet is stuck onto a predetermined division. Accordingly, the corresponding lead switch is turned into the ON state. Thus, the working situation of each person such as the job content can be managed by using the computer. That is, the information depicted on the magnet can be processed as data by using the computer.

However, this technique requires the same number of lead switches as the number of divisions with which it is intended to express the information. Therefore, an extremely large number of lead wires are arranged from the lead switches. As a result, a problem arises in that the assembling cost and the production cost of the writing board are highly expensive.

Further, this technique requires the bar code reader, and hence the apparatus is more expensive corresponding thereto. When the display magnet is stuck on the writing board, it is necessary to allow the bar code reader to read the bar code depicted on the display magnet. Therefore, a problem arises in that the operation is more complicated, and the operability is inferior.

SUMMARY OF THE INVENTION

The present invention has been made taking the foregoing problems into consideration, an object of which is to provide a magnet-based information input apparatus which makes it possible to know the position of a magnet by using a simple arrangement and which makes it possible to know attribute information of the magnet as data.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 14 shows a classifying table used to explain the operation of the embodiment of the present invention; and FIG. 15 shows an exemplary output to a monitor or the like.

DESCRIPTION OF THE PREFERRED EMBODIMENTS

An embodiment of the present invention will be explained below with reference to the drawings.

Figure 1:
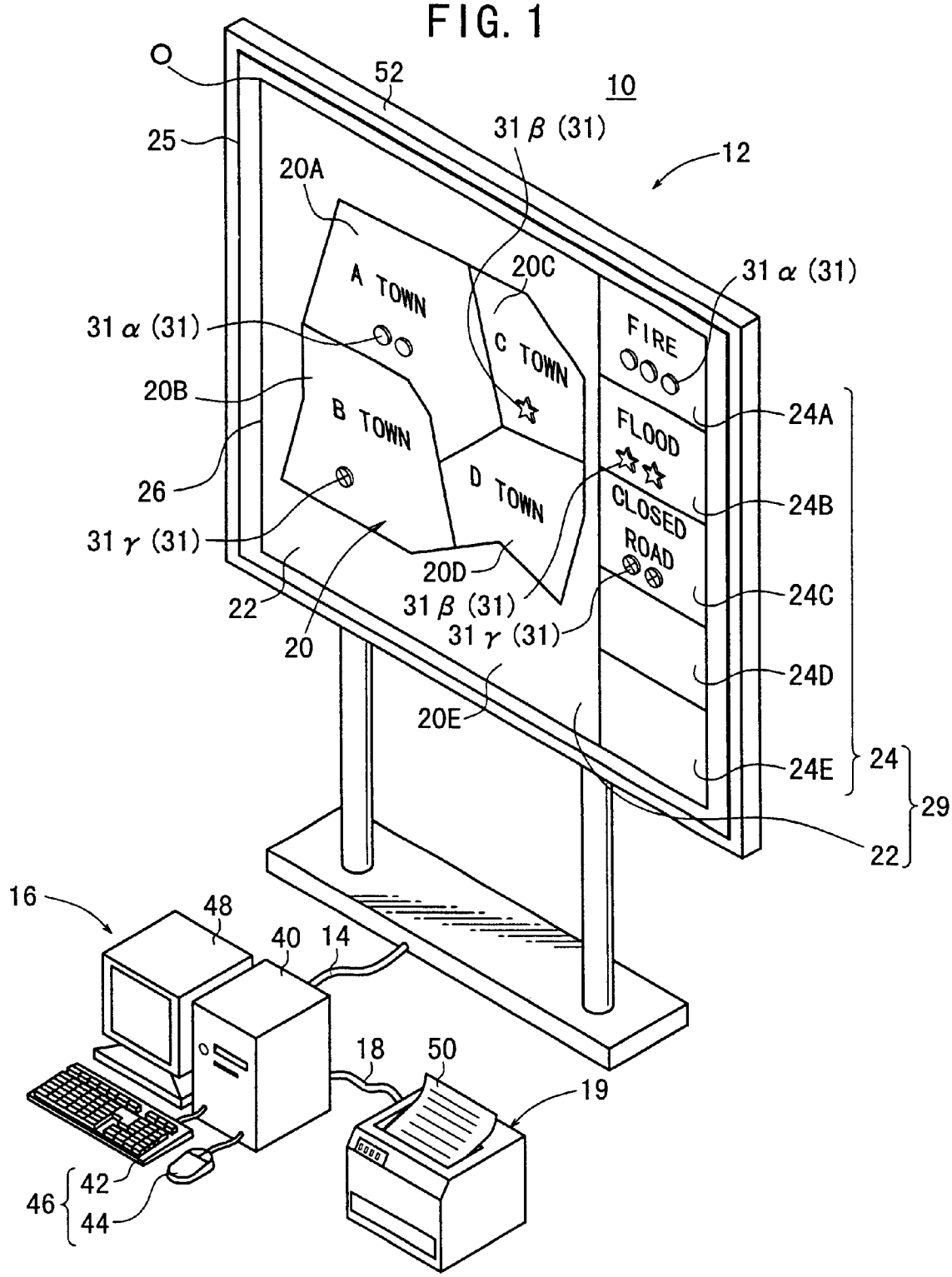
FIG. 1 shows a perspective view illustrating an arrangement of an information input/output system to which an embodiment of the present invention is applied.

FIG. 1 shows a basic arrangement of an information input/output system 10 to which the embodiment of the present invention is applied.

The information input/output system 10 basically comprises a magnet-based information input board 12, a personal computer 16 as an information-processing unit which is connected to the information input board 12 via a cable 14, and a printer 19 as an information output unit which is connected to the personal computer 16 via a cable 18.

The information input board 12 also functions as a writing board on which, for example, characters, symbols, and graphics can be drawn by using a marker or the like.

In this embodiment, a sheet member 25 is attached to the surface of the information input board 12. The sheet member 25 is divided into a map display area 22 on which a map 20 is drawn by means of, for example, printing, and an attributed magnet-accommodating area 24. Those usable as the sheet member 25 include magnet sheets, sheets made of magnetic materials, and sheets made of non-magnetic materials.

Ruled lines, which form the map display area 22 and the attributed magnet-accommodating area 24, are formed on the surface of the sheet member 25 by means of, for example, printing. A point "O", which is disposed at an upper-left corner of the ruled line (referred to as "frame line" as well) for forming the outermost frame, is used as the coordinate origin of the information input board 12 as described later on. In the embodiment shown in FIG. 1, the area defined within the frame line 26, i.e., the area obtained by combining the map display area 22 and the magnet-accommodating area 24 is designated as a sticking position/detachment position-determining area (referred to as "magnet position-determining area" as well) 29 for magnets 31.

Those drawn on the map 20 include an A town area 20A, a B town area 20B, a C town area 20C, and a D town area 20D concerning A town, B town, C town, and D town respectively, as well as an area 20E other than the above. The attributed magnet-accommodating area 24 is divided into a magnet-accommodating area 24A with an attribute indicating fire (referred to as "fire-indicating magnet-accommodating area" as well), a magnet-accommodating area 24B with an attribute indicating flood (referred to as "flood-indicating magnet-accommodating area" as well), a magnet-accommodating area 24C with an attribute indicating closed road (referred to as "closed road-indicating magnet-accommodating area" as well), and preliminary magnet-accommodating areas 24D, 24E.

In this embodiment, a white circular magnet $31\alpha$ means an attribute of fire. A star-shaped magnet $31\beta$ means an attribute of flood. A circled cross-marked magnet $31\gamma$, on which a cross mark is drawn in a circle, means an attribute of closed road. In this context, the white circular magnet $31\alpha$ will be hereinafter referred to as "fire-indicating magnet $31\alpha$" as well, the star-shaped magnet $31\beta$ will be hereinafter referred to as "flood-indicating magnet $31\beta$" as well, and the circled cross-marked magnet $31\gamma$ will be hereinafter referred to as "closed road-indicating magnet $31\gamma$" as well.

For example, when the station, at which the information input board 12 is installed, is informed, by a witness or the like, of the fact that a fire breaks out at a certain district in the A town area 20A, the white circular magnet $31\alpha$ is detached by an operator from the fire-indicating magnet-accommodating area 24A, and it is stuck onto a certain district in the A town area 20A on the map 20. When it is communicated that the fire is extinguished in the certain district in the A town, then the white circular magnet $31\alpha$, which has been stuck on the certain district in the A town area 20A, is detached, and it is returned and stuck onto the fire-indicating magnet-accommodating area 24A.

Considering the possibility that all of the magnets 31 are detached from a certain magnet-accommodating area 24, the characters of "fire", "flood", and "closed road" are previously written on the portions of the sheet member 25 (information input board 12) corresponding to the respective magnet-accommodating areas 24A, 24B, 24C.

When the position of the magnet 31 is changed on the information input board 12, an information signal (described later on), which indicates the fact that the position of the magnet is changed, is supplied via the cable 14 to a main body unit 40 of the personal computer 16. The personal computer 16 includes, for example, the main body unit 40, input devices 46 such as a mouse 42 and a keyboard 44 connected to the main body unit 40, and a CRT monitor 48 as a display means.

For example, the type of disaster such as the fire, the communication time for the disaster, and the place of occurrence such as the A town are displayed on the screen of the CRT monitor 48. The displayed screen is expressed as a hard copy 50 by the printer 19 which is connected via the cable 18.

Figure 2:
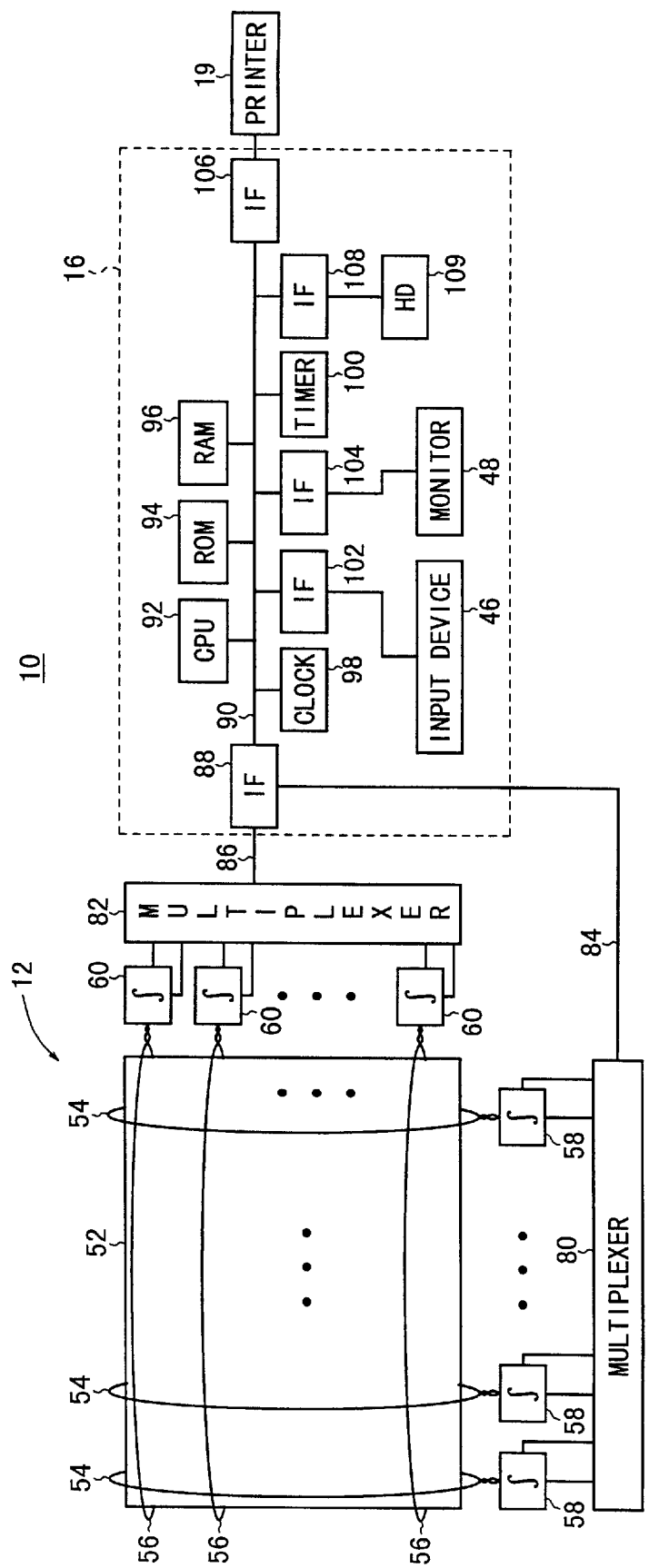
FIG. 2 shows a block diagram illustrating an arrangement including an electric circuit of the embodiment shown in FIG. 1.

FIG. 2 shows a block diagram including an electric circuit of the information input/output system 10 shown in FIG. 1.

The information input board 12 is composed of a magnetic plate 52. A plurality of coils 54, 56 are wound around the magnetic plate 52 at constant intervals in a lattice-shaped configuration in the vertical direction and in the horizontal direction respectively. In this embodiment, the magnetic plate 52 has a size of about 80 cm×60 cm, around which nine coils 54 in the vertical direction and seven coils 56 in the horizontal direction are wound at the intervals of 10 cm respectively. In this embodiment, the number of turns of the coils 54, 56 is 20 respectively. The geometric configuration of the coil 54 to be used, which is represented, for example, by the wire diameter and the winding width, is the same as that of the coil 56.

Figure 3:
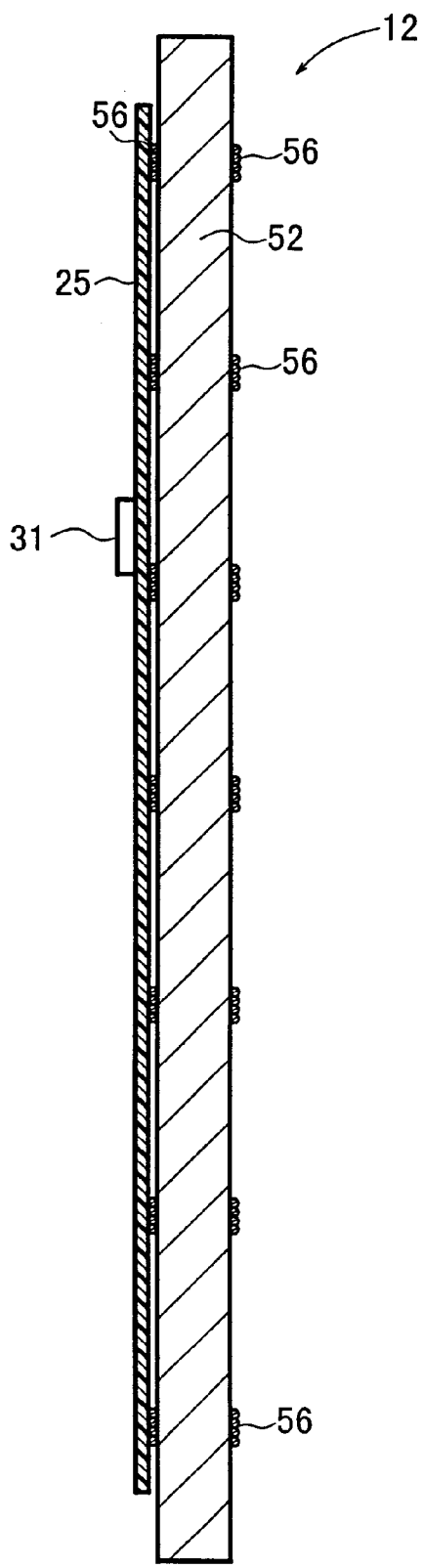
FIG. 3 shows a sectional view illustrating an information input board.

Practically, as shown in a partial sectional view in FIG. 3, the information input board 12 is constructed such that the sheet member 25, which also functions as the writing board, is attached to cover the magnetic plate 52 on the surface of the magnetic plate 52 around which the plurality of coils 54, 56 are wound (the coils 54 do not appear in FIG. 3). The magnet 31 is stuck onto the surface of the sheet member 25. For example, an iron plate is adopted for the magnetic plate 52. In this arrangement, it is sufficient that the thickness is not more than about 1 mm. Accordingly, a light and strong reinforcing plate such as a veneer board and a plate made of resin is laminated onto the back of the iron plate for the purpose of reinforcement. When the magnetic plate 52 is a reinforced plate provided with an iron plate, it is convenient that the reinforced plate is provided with grooves for winding the coils 54, 56 therearound.

With reference to FIG. 2 again, the respective coils 54 in the vertical direction are connected to nine integrating circuits 58 which function as induced electromotive force-detecting sections respectively. The respective coils 56 in the horizontal direction are connected to seven integrating circuits 60 which function as induced electromotive force-detecting sections respectively.

Figure 4:
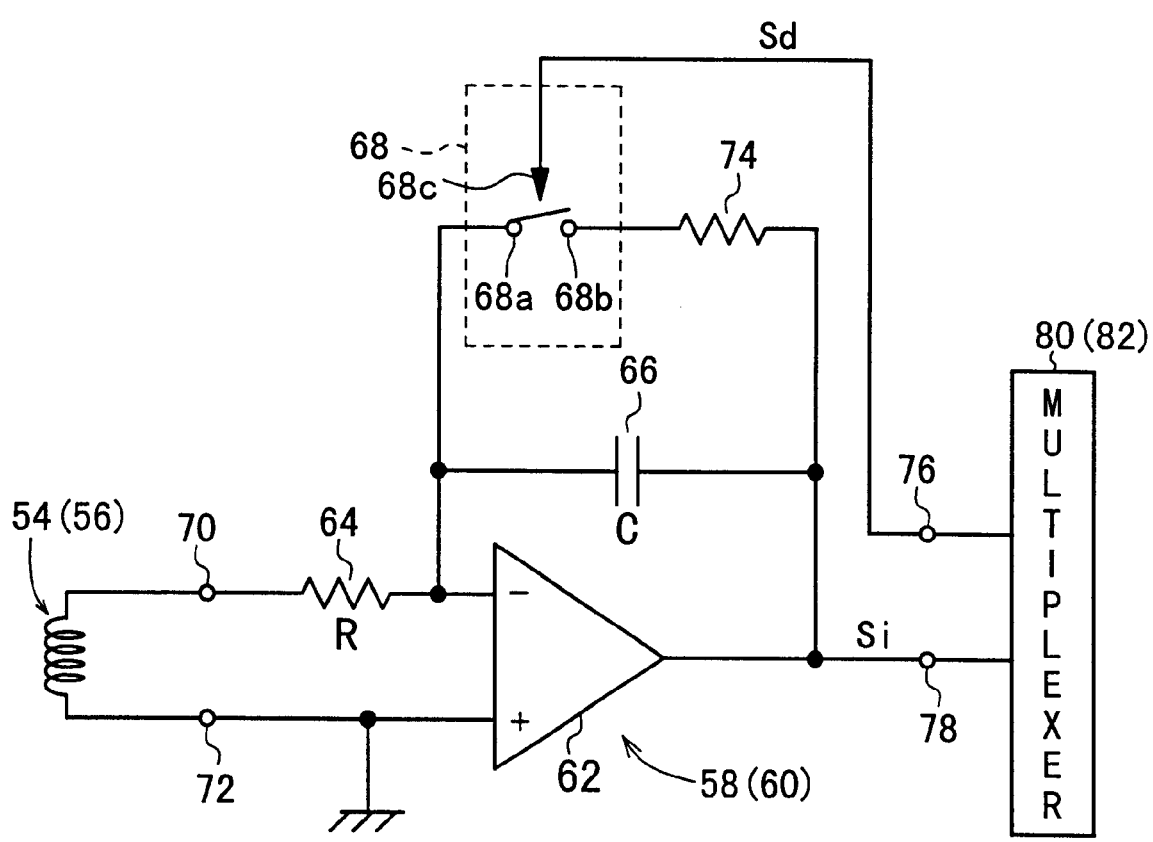
FIG. 4 shows a circuit diagram illustrating an arrangement of an integrating circuit.

FIG. 4 shows an illustrative arrangement of the integrating circuit 58 (60). The integrating circuit 58 (60) is constructed by using an operational amplifier 62. A capacitor 66 having a capacitance C is connected between an inverting input and an output of the operational amplifier 62. On end of a resistor 64 having a resistance value R is connected to the inverting input. The coil 54 (56) is connected via terminals 70, 72 between the other end of the resistor 64 and a non-inverting input which is allowed to have the ground electric potential. A serial circuit comprising a resistor 74 and an electronic switch 68 for discharging the capacitor 66 is attached in parallel to the capacitor 66. In principle, a power source and a part of grounded arrangement are omitted from the illustrative integrating circuit 58 (60) shown in FIG. 4, in order to avoid complicated illustration.

The electronic switch 68 comprises a movable contact 68a, a fixed contact 68b, and a control terminal 68c for opening/closing the movable contact 68a. The control terminal 68c and the integrating circuit 58 (60) are connected to the multiplexer 80 (82) shown in FIG. 2 via terminals 76, 78 respectively. An integral output of the induced electromotive force (referred to as "integral signal of the induced electromotive force" or "integral value of the induced electromotive force" as well) Si appears on the terminal 78 as described later on. A discharge control signal Sd, which is an ON/OFF control signal for the switch, is supplied from the multiplexer 80 (82) to the control terminal 68c.

Figures 14, 15:
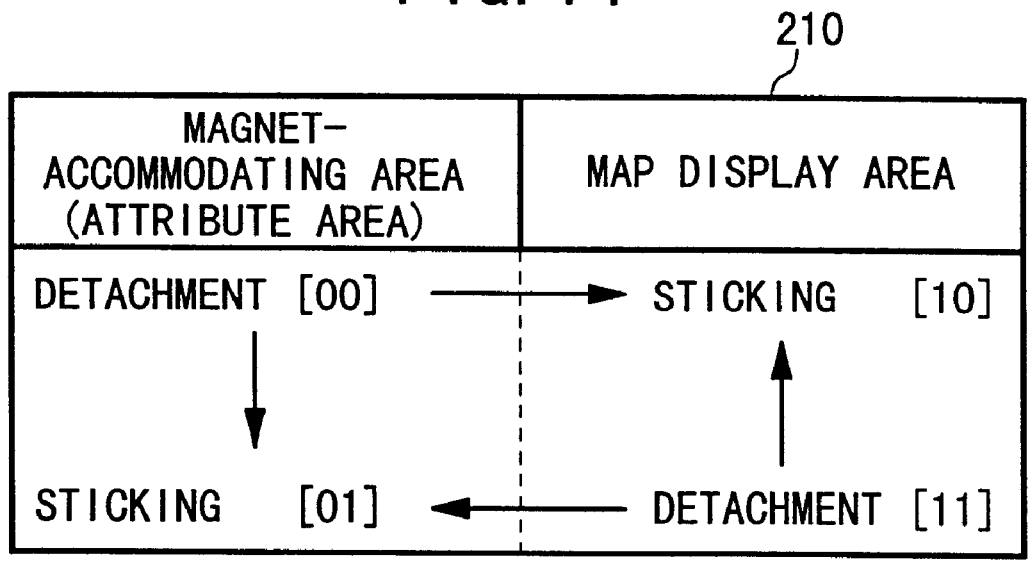

The multiplexers 80, 82 are connected to an interface 88 of the personal computer 16 via cables 84, 86 having control lines and signal lines respectively (the cables 84, 86 are included in the cable 14 shown in FIG. 14). The interface 88 includes an A/D converter and a level converter. The integral value Si of the induced electromotive force, which is generated in each of the coils 54, 56 to be detected by each of the integrating circuits 58, 60 and which is converted into digital data by the A/D converter, is supplied to a bus 90. The discharge control signal Sd from the bus 90 is supplied via the multiplexers 80, 82 to the control terminals 68c of the electronic switches 68 of the integrating circuits 58, 60.

Alternatively, the A/D converter and the level converter for constructing the interface 88 may be provided on the side of the information input board 12 so that the digital data may be transmitted through the cables 84, 86 (cable 14).

The personal computer 16 is a calculating machine. Those connected to the bus 90 include CPU (central processing unit) 92, ROM (including EEPROM such as flash ROM capable of rewriting in this embodiment) 94 as a memory (storage device), RAM (random access memory) 96 as a working memory, a clock 98 for obtaining year, month, date, and time, and a timer 100 for measuring the time. The input device 46 and the monitor 48 are also connected to the bus 90 via interfaces 102, 104 respectively. A hard disk (storage device) 109 as a large capacity storage medium is also connected to the bus 90 via an interface 108 such as a hard disk drive. Further, an interface 106 for the printer 19 is connected to the bus 90 as well.

Figure 5:
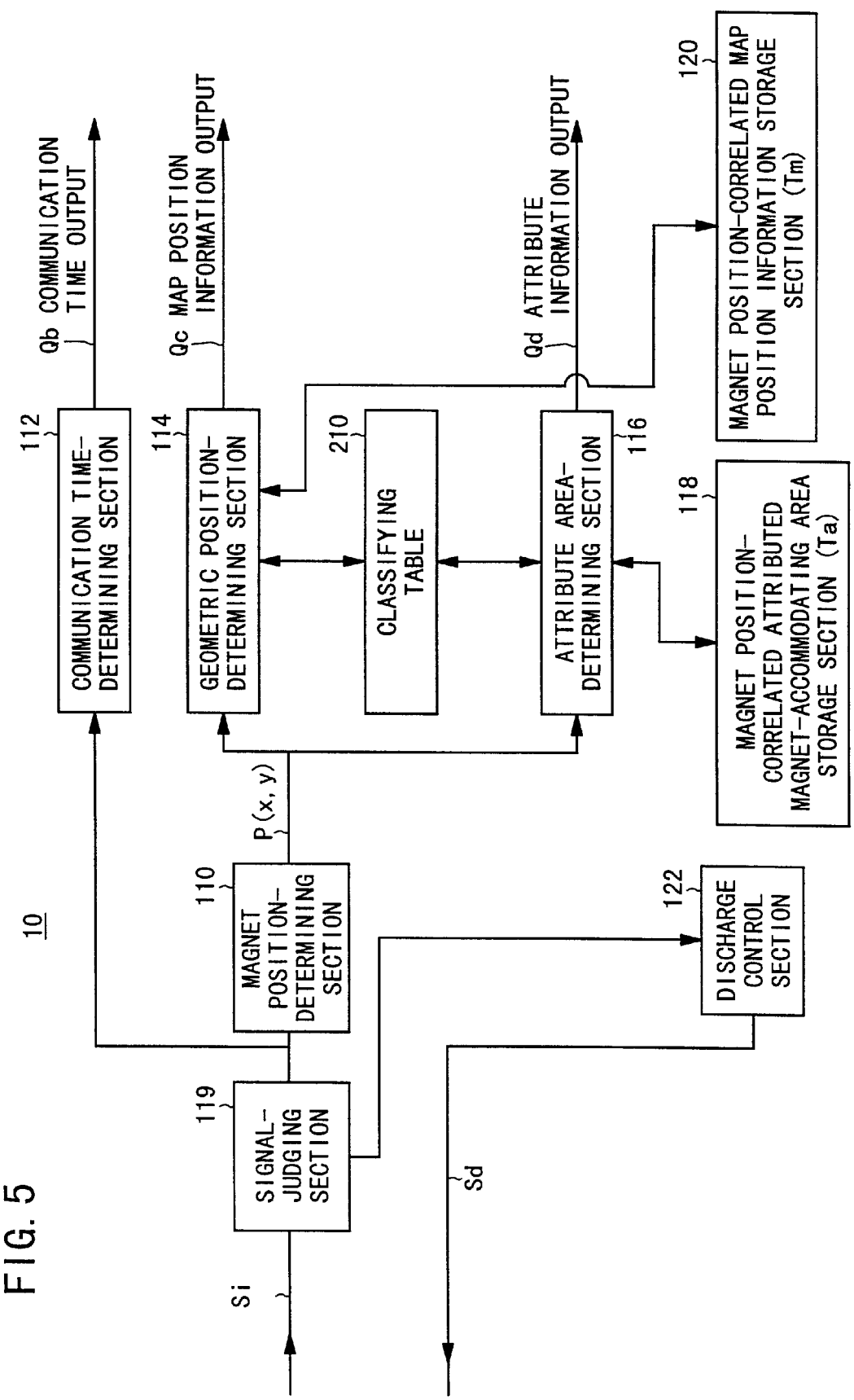
FIG. 5 shows a functional block diagram to be executed by a personal computer.

FIG. 5 shows a functional block diagram of the information input/output system 10, to be executed by the personal computer 16 (CPU 92) on the basis of a program stored in ROM 94 or on the hard disk 109.

The integral value Si of the induced electromotive force, which is the induced electromotive force output as the output of the multiplexer 80, 82, is supplied via a signal-judging section 119 to a magnet position-determining section 110 and a communication time-determining section 112.

The signal-judging section 119 performs the process to judge whether or not the integral value Si of the induced electromotive force is appropriate as the input information. The judging process is a process for confirming whether or not the level (signal level) of the integral value Si exceeds a predetermined threshold level for making distinction from noise, and whether or not the combination of the coils 54, 56 concerning the generation of the integral value Si is unnatural (for example, if the integral value Si (signal) is generated from the coils 54, 56 disposed at positions separated from each other, the combination is regarded to be unnatural).

Further, when the integral value Si is detected, the integral value Si, for which the judgement is judged to be appropriate, is supplied by the signal-judging section 119 to the magnet position-determining section 110 and the communication time-determining section 112. A discharge instruction signal, which is directed to the coil 54, 56 subjected to the detection of the integral value Si, is supplied by the signal-judging section 119 to a discharge control section 122 irrelevant to whether or not the integral value Si is appropriate.

The communication time-determining section 112 refers to the clock 98 to make an output as a communication time output Qb which represents the time obtained when the integral value Si of the induced electromotive force is supplied via the signal-judging section 119, in other words, when any change of not less than the predetermined threshold level occurs in the integral value Si of the induced electromotive force.

The magnet position-determining section 110 determines the detachment position and the sticking position of the magnet 31 on the magnet position-determining area 29 of the information input board 12 by using the standard of the coordinate origin A on the basis of the integral value Si of the induced electromotive force. The determined coordinate position P (x, y) is supplied to a geometric position-determining section 114 and an attribute area-determining section 116.

The geometric position-determining section 114 outputs a map position information output Qc on the basis of the coordinate position P (x, y) with reference to a classifying table 210 for the detachment/sticking operation with details to be described later on (referred to as "sticking/detachment classifying table" or simply referred to as "classifying table" as well), and a magnet position-correlated map position information storage section (storage device) 120 in the hard disk 109.

The attribute area-determining section 116 outputs an attribute information output Qd on the basis of the coordinate position P (x, y) with reference to the classifying table 210 and an attributed magnet position-correlated magnet-accommodating area storage section 118 in the hard disk 109.

In this embodiment, the communication time output Qb is, for example, the information on the year, month, date, and time of communication of the occurrence of fire or the like. The map position information output Qc is, for example, the information on A town (name of town) and its name of district. The attribute information output Qd is the attribute information on the fire, closed road, flood or the like. The communication time output Qb, the map position information output Qc, and the attribute information output Qd are stored in a predetermined storage section on the hard disk 109 contained in the main body unit 40 of the personal computer 16.

When the coordinate position P (x, y) of the magnet is determined by the magnet position-determining section 110, the discharge control unit 122 is informed of this fact. Accordingly, the discharge control signal Sd is in the ON state, and the movable contact 68a is closed for a certain period of time so as to discharge the electric charge concerning the integral value Si of the induced electromotive force charged in the capacitor 66, in other words, the electric charge which represents the coordinate position P (x, y).

Next, the operation of the embodiment described above will be explained in further detail below.

At first, explanation will be made on the basis of the operation principle of the magnet position-determining section 110.

Figure 6:
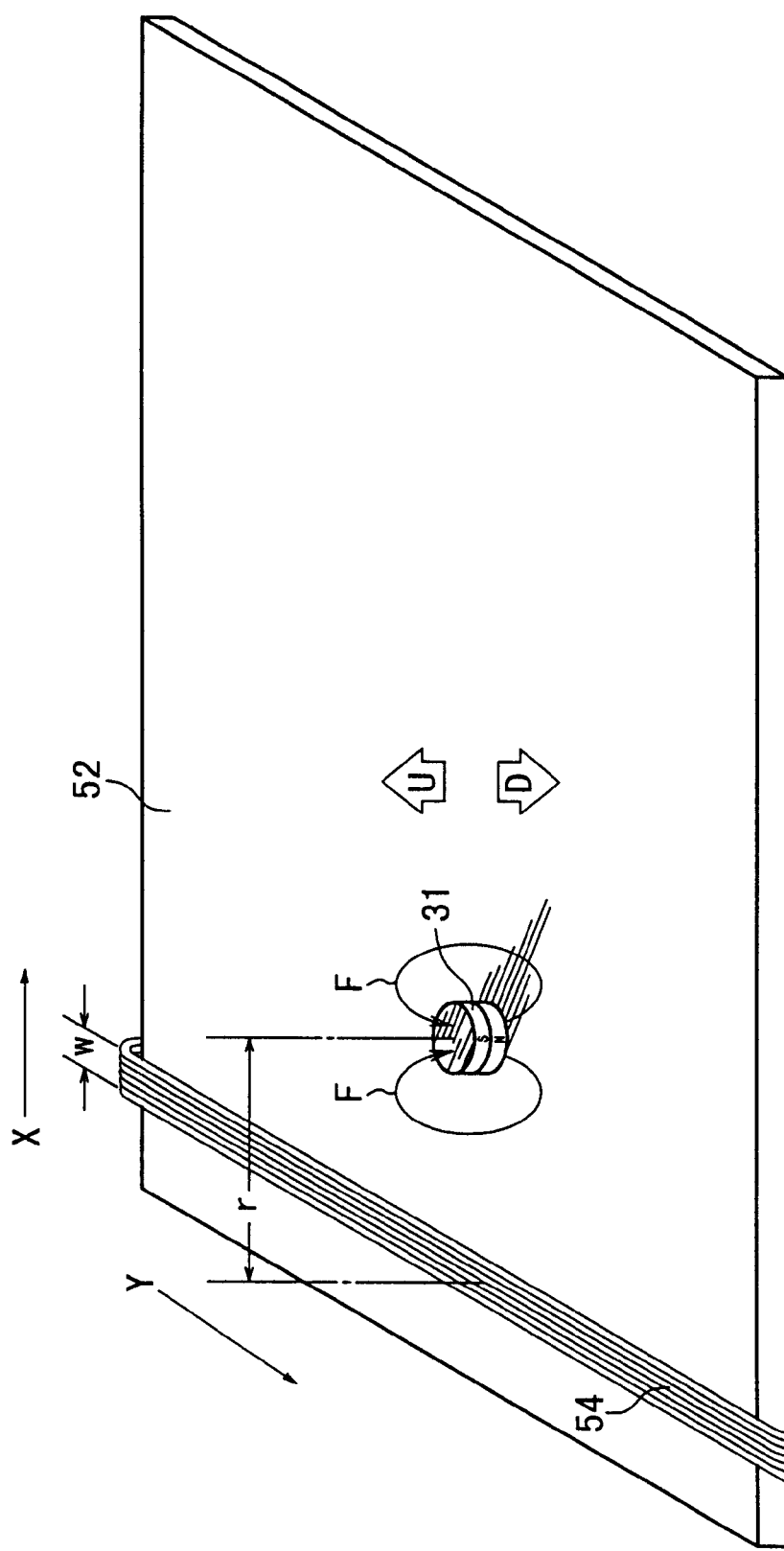
FIG. 6 shows a perspective view used to explain the determination of the magnet position.

FIG. 6 shows a situation in which one coil 54 is wound in the vertical direction around the magnetic panel 52. When the magnet 31, which generates the magnetic flux F, is moved in the detachment direction U or in the sticking direction (attachment direction) D with respect to the magnetic panel 52, the magnetic flux $\phi$, which penetrates through the coil 54, is changed. When the temporal change of the magnetic flux $\phi$ occurs, the induced electromotive force E is generated in the coil 54 in accordance with the electromagnetic induction.

The change of the magnetic flux $\phi$ penetrating through the coil 54 is determined by the distance r between the coil 54 and the magnet 31. However, the amount of temporal change of the induced electromotive force E ($-d\phi/dt$: $d\phi$ represents the magnetic flux change, and dt represents the temporal change) depends on the sticking (attachment) velocity and the detachment velocity of the magnet 31. That is, the value of the induced electromotive force E differs depending on whether the operator performs the attachment/detachment operation for the magnet 31 slowly or quickly.

On the other hand, the temporal integral value of the induced electromotive force E generated in the coil 54 (see the position of the symbol of the integral value Si of the induced electromotive force shown in FIG. 4) is the amount which is proportional to the amount of the change of the magnetic flux $\phi$. In principle, if the magnetization intensity of the magnet 31 is constant, the temporal integral value is the amount which depends on the distance r between the magnet 31 and the coil 54.

Figure 7:
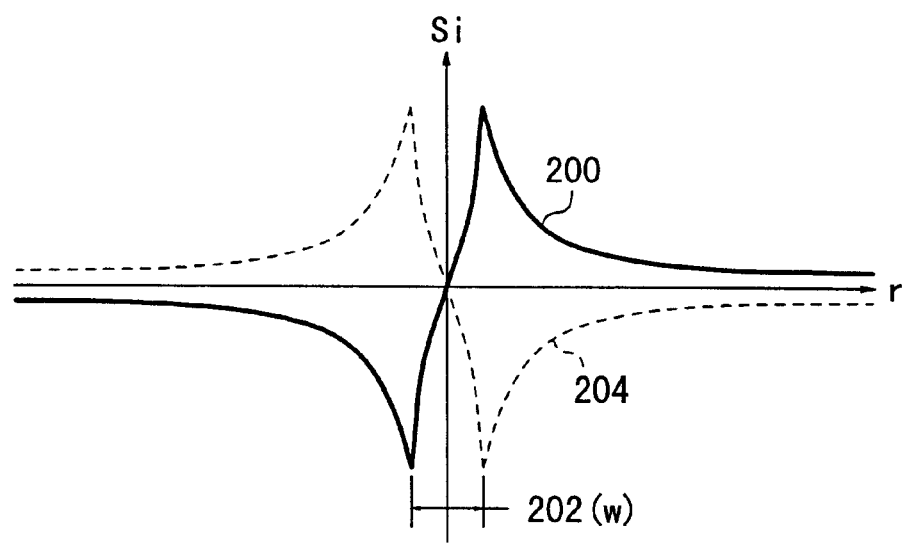
FIG. 7 shows characteristic curves used to explain the determination of the magnet position.

FIG. 7 shows a characteristic 200 obtained as the measured value for the signal (integral value of the induced electromotive force) Si of the induced electromotive force of the coil 54 after the passage through the integrating circuit 58, when the distance r between the coil 54 and the magnet 31 is changed.

The region 202, which exists in the vicinity of the origin for the characteristic 200, corresponds to the sum of the radius of the magnet 31 and the width W of the substantial winding portion of the coil 54 (see FIG. 6). It is understood that when the distance is farther separated from the region 202 corresponding to the winding portion having the width W, the integral value Si of the induced electromotive force is decreased substantially in a inversely proportional manner. As for the cases in which the magnet 31 is stuck and detached, the characteristics 200, 204 are simply obtained, in which the polarity is mutually inverted. In these cases, the identical value of the integral value Si of the induced electromotive force is obtained with respect to the distance r.

The integral value Si of the induced electromotive force can be approximated by the following expression (1) of the substantial inverse proportion in the regions except for the region 202 provided that the constant proportional to the magnetization intensity of the magnet 31 is A, and the constant to determine the inclination (curvature) of the curve is b.

$$Si=A/r^b \tag{1}$$

It is needless to say that the characteristics 202, 204 described above also hold in the same relation between the magnet 31 and the coil 56 in the horizontal direction as well as the coil 54 in the vertical direction.

Therefore, the characteristics 200, 204 are previously measured for the integral value Si of the induced electromotive force with respect to all of the coils 54, 56 in all of the areas of the magnet position-determining area 29 on the sheet member 25, and they are stored in ROM 94 as the memory (or in the hard disk 109 as well). Thus, it is possible to specify the sticking position and the detachment position of the magnet 31 in all of the areas of the magnet position-determining area 29 on the sheet member 25.

Strictly speaking, if the size of the magnet 31 is changed, the accuracy of the relational expression (1) is slightly lowered. However, it has been experimentally confirmed that the expression (1) provides the approximation which is practically sufficient. In the illustrative embodiment shown in FIG. 1, the magnet 31β for indicating flood is the star-shaped magnet. However, the magnet 31β for indicating flood is not necessarily the star-shaped magnet, but it may be a circular magnet drawn with a symbol of star, in the same manner as in the magnet 31α for indicating fire and the magnet 31γ for indicating closed road.

If the velocity is extremely slow when the magnet 31 is stuck or detached, or if the magnet 31 is once stopped immediately before it is stuck, then it is feared that the characteristics 200, 204 shown in FIG. 7 do not hold. Such a situation is caused by any improper output of the integrating circuit 58, 60, because the operation is so slow as to exceed the time constant of the integrating circuit 58, 60. However, according to experiments requested to be performed by many operators, it has been revealed that there is an extremely minute difference in dispersion of the integral value Si of the induced electromotive force depending on the operator. It has been confirmed that the velocity of operation practically causes no problem at all.

Figure 8:
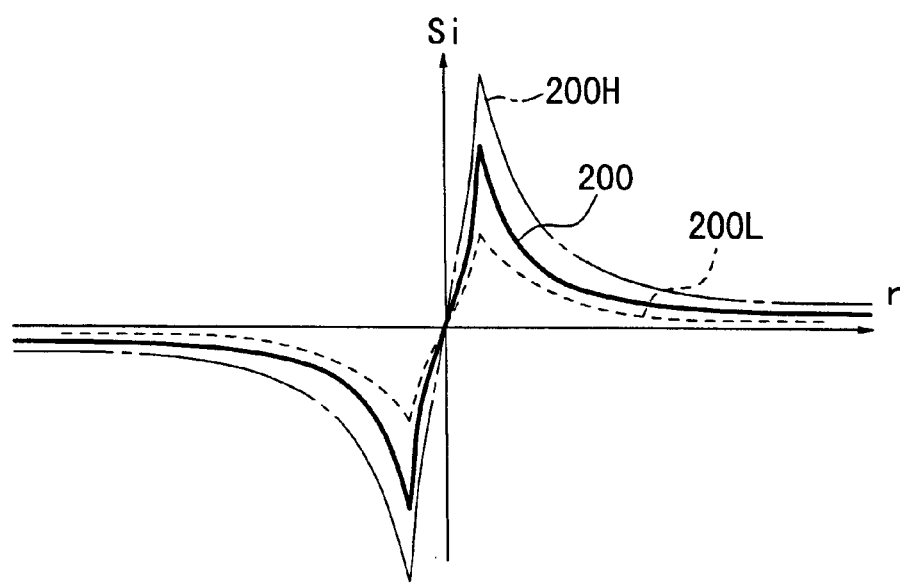
FIG. 8 shows characteristic curves used to explain the determination of the magnet position concerning a case in which the magnetizing force is changed.

However, practically, when the magnet position is measured by using a pair of the coil 54 in the vertical direction and the coil 56 in the horizontal direction respectively, if the magnetization intensity of the magnet 31 is different, the characteristic 200 is changed as shown in FIG. 8. That is, assuming that the characteristic 200 gives the standard value of the magnetization intensity of the magnet 31, if the magnetization intensity is larger than the above, the value of the integral value Si of the induced electromotive force is increased as shown by a characteristic 200H, while if the magnetization intensity is smaller than the above, the integral value Si is decreased as shown by a characteristic 200L.

Accordingly, in order to eliminate any influence of the difference in degree of the magnetization intensity, the information input/output system 10 uses the two or more coils 54, 56 for the X axis and the Y axis respectively to measure the distance r.

Figure 9:
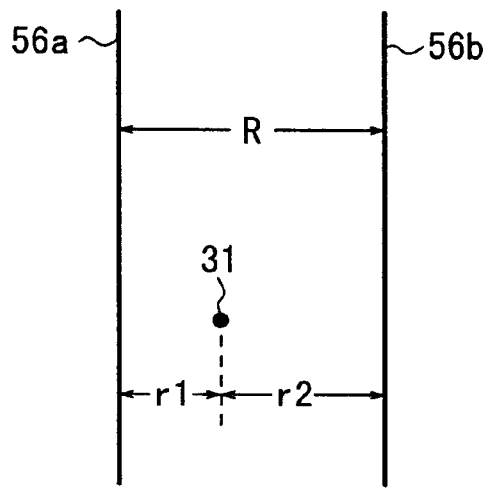
FIG. 9 shows a schematic view used to explain the determination of the magnet position.

An illustrative measurement operation in accordance with this procedure will be explained. For example, as shown in FIG. 9, it is assumed that the magnet 31 is stuck or detached at a point at which the distance from the coil 56a is r1 and the distance from the coil 56b is r2 provided that the linear distance between the adjacent coils 56a, 56b is R. In this case, it is assumed that the integral value Si of the induced electromotive force generated by the coil 56a is Si=S1, and the integral value Si of the induced electromotive force generated by the coil 56b is Si=S2.

On this condition, with reference to the expression (1) described above and FIG. 9, it is easily understood that the following expressions (2), (3), (4) hold.

$$S1 = A/(r1)^b \quad (2)$$

$$S2 = A/(r2)^b \quad (3)$$

$$r2 = r1 - R \quad (4)$$

If the foregoing expressions (2), (3), (4) are solved for the distance r1, the distance r1 is obtained by the following expression (5).

$$r1 = R/\{1-(S1/S2)^{1/b}\} \quad (5)$$

As understood from the expression (5), when the integral values S1, S2 of the induced electromotive forces concerning the plurality of coils 56a, 56b in the same direction are used, the distance r1 can be determined by using only the distance R between the coils 56a, 56b, the integral values S1, S2, and the constant b, irrelevant to the magnetization intensity A of the magnet 31.

By using the principle explained above, the integral values Si of the induced electromotive forces generated in the coils 54, 56 are always measured (meaning that the integral values Si are repeatedly measured with an extremely short period of time) when the magnet 31 is stuck or detached while arranging the coils 54, 56 at the constant spacing distances in the vertical direction and in the horizontal direction on the magnetic plate 52. Thus, it is possible to determine the time of sticking or detachment of the magnet 31, and the sticking position or the detachment position thereof.

When it is intended to determine the sticking/detachment position more correctly, the integral values Si of the induced electromotive forces of three or more coils 54, 56 may be used in both of the X axis direction and the Y axis direction respectively. Thus, the error in the positional determination can be minimized by using, for example, a technique of the least-squares method.

This embodiment uses the respective three coils 54, 56 of the coils 54, 56, which are disposed in the vicinity of the sticking/detachment position of the magnet 31 respectively.

Figure 10:
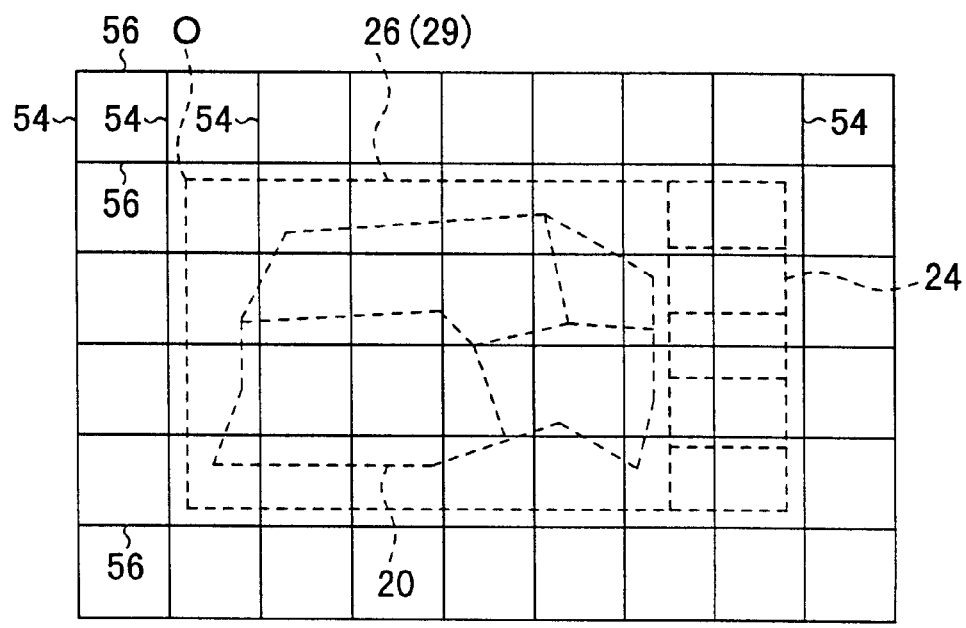
FIG. 10 shows a diagram in which a magnet position-determining area is depicted over a coil.

Specifically, FIG. 10 illustrates and depicts the arrangement of the coils 54, 56, the frame line 26, and the frame lines of the magnet position-determining area 29, the map 20, and the magnet-accommodating area 24.

Figure 11:
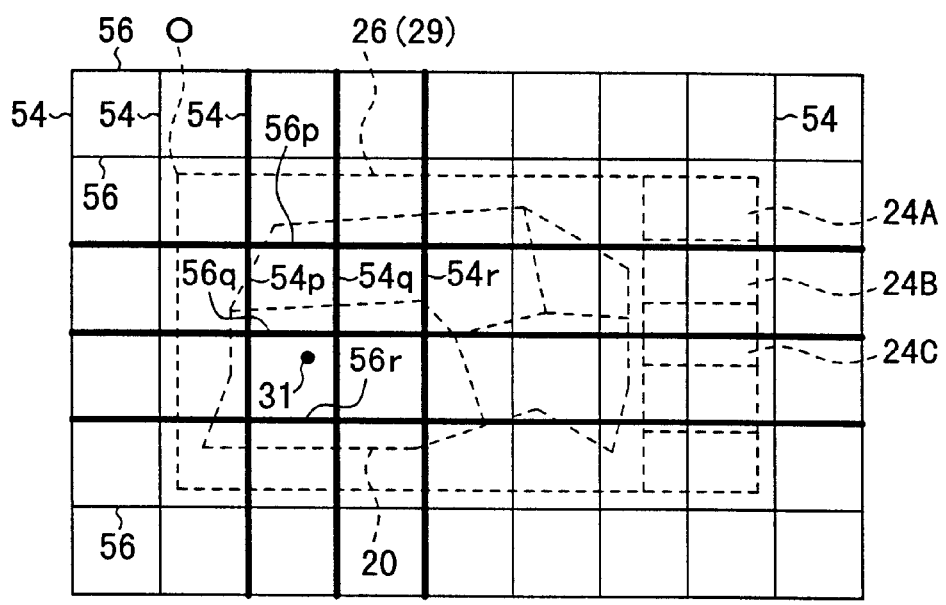
FIG. 11 shows a diagram used to explain the coil to be subjected to the determination of the magnet position.

When the magnet 31 is stuck at a position shown in FIG. 11, the respective three integral values Si of the induced electromotive forces are used, concerning the three coils 54p, 54q, 54r in the vertical direction and the three coils 56p, 56q, 56r in the horizontal direction which are described in an order starting from those disposed nearer to the magnet 31. The position of the magnet 31 on the map 20 or the position of the magnet 31 in the magnet-accommodating area 24A, 24B, 24C is determined on the basis of the respective three integral values Si of the induced electromotive forces.

The foregoing description has been made to explain the operation for determining the coordinate position P (x, y) performed by the magnet position-determining section 110. In this embodiment, the coordinate position P (x, y) of the magnet 31 is determined on the basis of the integral value Si of the induced electromotive force concerning the sticking/detachment operation of the magnet 31. Therefore, for example, even when the system is contaminated with any high frequency noise or the like during the measurement, then the influence of the noise can be eliminated owing to the integrating function of the integrating circuit 58 (60), and the position can be determined correctly.

The information input/output system 10 shown in FIG. 1 is operated such that the multiplexers 80, 82 are subjected to the scanning within an extremely short period of time so that the integral values Si of the induced electromotive forces, which are the outputs of the integrating circuits 58, 60 for the respective coils 54, 56, may be incorporated into the personal computer 16. Therefore, it is unnecessary to provide any peak hold circuit or the like on the output side of the integrating circuits 58, 60. However, for example, when it is intended to further increase the magnet position-determining area 29, a peak hold circuit is inserted into the output side of the integrating circuits 58, 60, if necessary. Thus, it is possible to eliminate any error in the amount of change of the integral value Si of the induced electromotive force generated in the respective coils 54, 56, which would be caused due to the delay time for the scanning for the multiplexers 80, 82.

Next, when the coordinate position P (x, y), at which the magnet 31 is stuck, is determined, the operation is performed to determine to what area depicted on the information input board 12 the coordinate position P (x, y) belongs, by using the geometric position-determining section 114 and the attribute area-determining section 116. Explanation will be made for the preparation of the storage data in the magnet position-correlated attributed magnet-accommodating area storage section 118 (referred to as "attribute information reference table Ta" as well) and the storage data in the magnet position-correlated map position information storage section 120 (referred to as "map position information reference table Tm" as well) which are referred to for the purpose described above.

In order to easily understand the present invention, it is now assumed that the areas to be specified are the A town area 20A shown in FIG. 1, the B town area 20B, the C town area 20C, the D town area 20D, and the area 20E other than the above, as well as the fire-indicating magnet-accommodating area 24A, the flood-indicating magnet-accommodating area 24B, the closed road-indicating magnet-accommodating area 24C, and the preliminary magnet-accommodating areas 24D, 24E other than the above. It is a matter of course that the inside of the town may be depicted by being further divided into districts to specify the area. However, practically, such a district can be determined by utilizing a database such as a map information system (GIS).

In this case, explanation will be firstly made with reference to FIG. 3. The sheet member 25 is attached to the surface of the magnetic plate 52 around which the coils 54, 56 are wound. The map 20 and the attributed magnet-accommodating areas 24 may be printed on the sheet member 25. Alternatively, the sheet member 25 may be attached to the surface of the magnetic plate 52 provided with the coils, and then the map 20 is stuck or drawn on the sheet member 25, or the attributed magnet-accommodating areas 24 may be stuck or drawn thereon.

Figure 12:
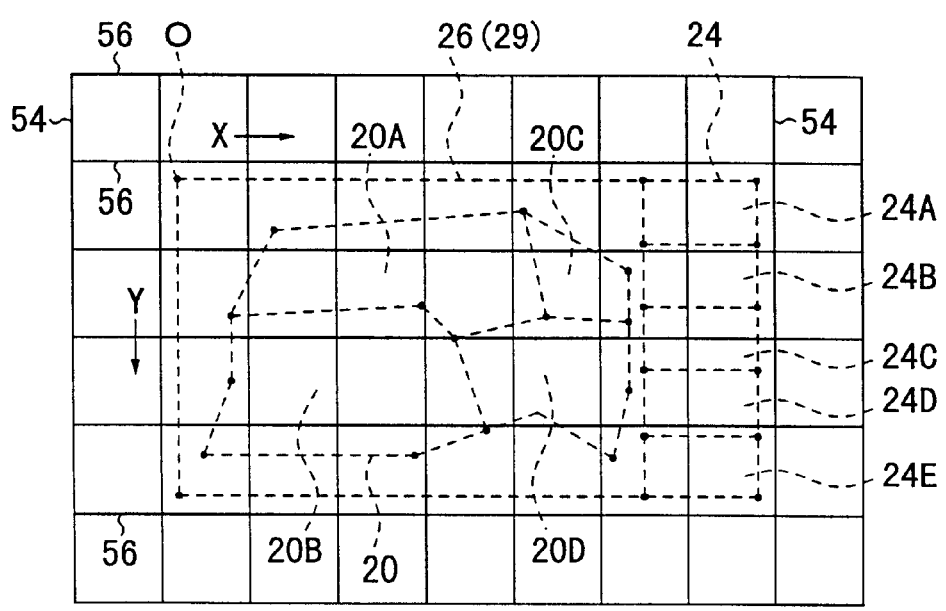
FIG. 12 shows a diagram used to explain the determination of the coordinate position on a map and in a magnet-accommodating area.

In this embodiment, the sheet member 25 including the map 20 and the like is attached at the position on the magnetic plate 52 provided with the coils as shown in FIG. 12.

Next, the magnet 31 is placed on the reference position (coordinate origin) O of the magnet position-determining area 29 shown in FIG. 12, and the position coordinate of that point is designated to be the origin position coordinate P (0, 0).

Subsequently, the magnet 31 is successively stuck onto apex positions (including the reference position O) indicated by solid circles in FIG. 12 for partitioning the respective areas 20A to 20D and 24A to 24E in the frame line 26 to obtain position coordinates P (x, y) of the respective apex positions with respect to the origin position coordinate. Thus, it is possible to determine the ranges of the coordinate positions P (x, y) of the respective areas 20A to 20D and 24A to 24E with respect to the origin of the reference position O.

That is, the map position information reference table Tm is prepared to indicate the ranges of the respective coordinate positions P (x, y) for the A town area 20A, the B town area 20B, the C town area 20C, the D town area 20D, and the area 20E other than the above. Further, the attribute information reference table Ta is prepared to indicate the ranges of the respective coordinate positions P (x, y) for the fire-indicating magnet-accommodating area 24A, the flood-indicating magnet-accommodating area 24B, the closed road-indicating magnet-accommodating area 24C, and the preliminary magnet-accommodating areas 24D, 24E other than the above.

The attribute information reference table Ta determined as described above is stored in the magnet position-correlated attributed magnet-accommodating area storage section 118. The map position information reference table Tm is stored in the magnet position-correlated map position information storage section 120.

The position on the map, i.e., the latitude and the longitude are previously known on the map 20. Therefore, when the latitudes and the longitudes are previously stored for appropriate two points on the map 20, the ranges of the areas 20A to 20E including the map 20 can be also represented by the latitudes and the longitudes by means of the proportional calculation. When the latitudes and the longitudes are inputted into the database such as the map information system (GIS), it is possible to specify, for example, the place, the name of the city, the name of the town, and the district on the map.

Figure 13:
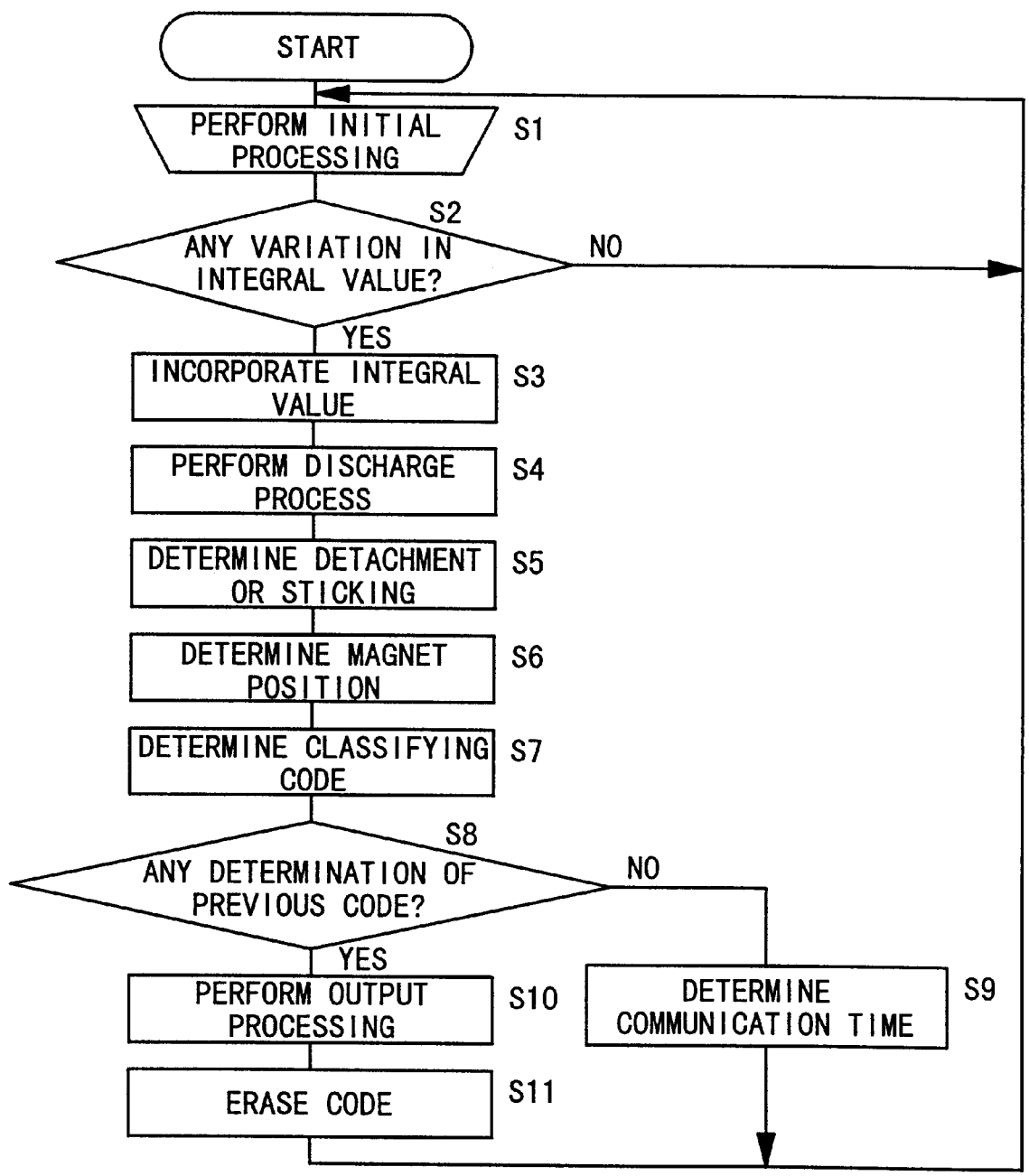
FIG. 13 shows a flow chart used to explain the operation of the embodiment of the present invention.

Next, the overall operation of the information input/output system 10 described above will be explained with reference to a flow chart shown in FIG. 13. Before this explanation, another explanation will be made for the relationship between the position determination for the magnet 31 and the judgement on the detachment or sticking.

As illustrated by the characteristics 200, 204 shown in FIG. 7, the polarity of the integral value Si is inverted for the cases in which the magnet 31 is stuck on the information input board 12 or the magnet 31 is detached therefrom. Therefore, when the integral value Si of the induced electromotive force of the coil 54, 56 is detected (measured), if it is known whether the movement operation for the magnet 31 is the sticking operation or the detachment operation, then it is possible to select the characteristic 200 or the characteristic 204 corresponding thereto. Thus, a unique position of the magnet 31 can be determined. As described above, in order to determine the magnet position from the integral value Si of the induced electromotive force of the coil 54, 56, it is necessary to make the judgement on the sticking/attachment operation.

On the other hand, the movement operation for the magnet 31 always comprises a set (combination or pair) of two operations of the detachment from a certain place and the following sticking on a desired place. This process can be considered as follows in view of the initial state in which all of the magnets 31 are stuck on the magnet-accommodating area 24. That is, the first operation can be regarded as the detachment, and the second operation can be regarded as the sticking. In other words, after a series of operations including the detachment and the sticking are completed, the next operation is started again from the detachment operation. Therefore, it is judged that the first operation starting from the initial state is the detachment, and the next operation is the sticking. At this point of time, the pair of operations (pair of the detachment operation and the sticking operation caused after the detachment operation) are reset to make the judgement again such that the initial operation is the detachment operation, and the second operation is the sticking operation.

In order to more conveniently judge the detachment and the sticking operations, the following arrangement may be available. That is, the position is detected for the map display area 22 by using the coils 54, 56 which are arranged in the lattice-shaped configuration. Pairs of coils other than the coils 54, 56 are provided for each of the magnet-accommodating areas 24A to 24E for constructing the attributed magnet-accommodating area 24. The respective pairs of coils are used to make detection for the respective magnet-accommodating areas 24A to 24E.

Accordingly, at first, the initial processing is performed in the step S1. That is, all of the magnets 31 are detached from the information input board 12. The magnets $31\alpha$, $31\beta$, $31\gamma$ are stuck on the fire-indicating magnet-accommodating area 24A, the flood-indicating magnet-accommodating area 24B, and the closed road-indicating magnet-accommodating area 24C which are the predetermined accommodating areas corresponding to the magnets $31\alpha$, $31\beta$, $31\gamma$ respectively.

In the following operation, it is assumed that those detached from the magnet-accommodating areas 24A, 24B, 24C are necessarily used as the magnet 31 to be stuck on the information input board 12, or more exactly on the magnet position-determining area 29 (the area including the map display area 22 and the magnet-accommodating area 24 in combination).

As shown in the classifying table 210 for the detachment/sticking operation in FIG. 14, four types of (four-valued) classifying codes (simply referred to as "codes" as well) [ij]=[00, 01, 10, 11] are used. It is assumed that the magnet 31 detached from the magnet-accommodating area 24A, 24B, 24C indicated by the code [00] is stuck on the map display area 22 in dicated by the code [10] (any area of the A town area 20A, the B town area 20B, the C town area 20C, and the D town area 20D), or it is returned to (stuck again on) the same area as the magnet-accommodating area 24A to 24C indicated by the code [01] from which the magnet 31 has been detached. The process to return the magnet 31 to the same area is provided in consideration of the case in which the magnet 31 is erroneously detached.

Similarly, it is assumed that the magnet 31 detached from the map display area 22 (any area of the A town area 20A, the B town area 20B, the C town area 20C, and the D town area 20D) indicated by the code [11] is stuck on the magnet-accommodating area 24A, 24B, 24C indicated by the code [01], or it is returned to the same area as the map display area 22 indicated by the code [10] from which the magnet 31 has been detached, in consideration of the case in which the magnet 31 is erroneously detached.

The attachment/sticking classifying table 210 is previously stored in ROM 94, and it is referred to by the geometric position-determining section 114 and the attribute area-determining section 116 (see FIG. 5 as well).

It is further assumed that two or more magnets 31 are not simultaneously moved at once from the magnet-accommodating area 24A, 24B, 24C to the map display area 22, or from the map display area 22 to the magnet-accommodating area 24A, 24B, 24C.

In the initial processing, the personal computer 16, which functions as the control means, opens the switch 68 by the aid of the discharge control signal Sd so that the integrating circuit 58 (60) is in the state capable of the integrating operation.

Subsequently, in the step S2, the outputs of all of the integrating circuits 58, 60, i.e., the integral values Si of the induced electromotive forces are always incorporated (scanned), for example, at about every 0.1 second as a constant cycle to monitor whether or not the integral value Si is varied.

When any communication concerning any disaster or the like is received, for example, by telephone or wireless telephone in the state in which all of the magnets are stuck on the magnet-accommodating areas 24A, 24B, 24C, the operator for the magnet 31 (mover for the magnet 31) detaches the magnet 31 corresponding to the communicated disaster information.

When the magnet 31 is detached, the induced electromotive forces E are generated in the coils 54, 56, which is caused by the detachment of the magnet 31. In the step S3, the integral values Si of the respective induced electromotive forces of the respective sixteen integrating circuits 58, 60 connected to the respective coils 54, 56 are incorporated by the signal-judging section 119, and they are once stored in RAM 96.

When the integral values Si are incorporated, the signal-judging section 119 confirms that the magnitudes of the integral values Si of the induced electromotive forces stored in RAM 96 are not less than a certain threshold level, and that the signals are supplied from the adjoining coils 54, 56, in order that the signals are not any noise or the like but they are caused by the induced electromotive forces E supplied from the magnet 31. During this process, the signal-judging section 119 supplies the discharge instruction signal to the discharge control section 122.

Subsequently, in the step S4, the discharge control signal Sd, which is changed to have the level to close the switch 68 of the integrating circuit 58 (60), is supplied by the discharge control section 122 for a certain period of time to the control terminal 68c of the electronic switch 68 to discharge the electric charge accumulated in the capacitor 66. Accordingly, the integrating circuit 58 (60) is restored again to be in the state capable of the integrating operation.

Subsequently, in the step S5, the judgement on the attachment/sticking of the magnet 31 is made on the basis of the procedure of the movement operation for the magnet 31. In this case, it is judged that the magnet 31 is subjected to the detachment, because the operation is the first operation starting from the initial state.

Subsequently, in the step S6, the magnet position-determining section 110 determines the position P (x, y) of the detached or stuck magnet 31 on the basis of the detachment/sticking judgement result obtained in the step S5 and the integral values Si having the first to third largest values respectively described above obtained from those of the integrating circuits 60 arranged for the coils 56 in the horizontal direction and the integrating circuits 58 arranged for the coils 56 in the vertical direction, of the integral values Si of the induced electromotive forces incorporated into RAM 96 in the step S3. The magnet position P (x, y) is once stored in RAM 96.

Subsequently, in the step S7, the geometric position-determining section 114 and the attribute area-determining section 116 determine the classifying code [ij] to be stored in RAM 96 by making reference to the classifying table 210 on the basis of the determined magnet position P (x, y) and the detachment or sticking judgement result.

For example, when the magnet 31 is detached from the magnet-accommodating area 24, the classifying code [00] is stored. The magnet-accommodating area 24 concerning thereto has been specified and concluded by the magnet position-determining process performed in the step S4.

Subsequently, in the step S8, the geometric position-determining section 114 and the attribute area-determining section 116 judge whether or not the classifying code [ij] is determined in the process performed in the previous step S7.

If the classifying code [ij] is not determined, the communication time-determining section 112 determines, in the step S9, the incorporation time of the integral value Si in the step S3 with reference to the clock 98, and an obtained result is stored as the communication time output Qb in the hard disk 109. It is noted that the processes ranging from the step S2 to the step S9 are instantaneously performed.

Subsequently, the variation of the integral value Si in the step S2 is confirmed again.

If any variation is confirmed next time, the verification is made for the signal incorporation for the integral value Si (step S3), followed by performing the discharge process (step S4). Further, it is judged whether the operation is the detachment operation or the sticking operation in relation to the operation previously performed (step S5). Subsequently, the position of the magnet 31 is determined on the basis of the detachment/sticking judgement result and the newly obtained integral value Si (step S6).

If the operation is determined to be the sticking operation in the step S6, the classifying code is determined to be, for example, the code [10] in the step S7.

Subsequently, if the determination is made for the previous classifying code in the step S8, the output processing is performed in the step S10. In this case, the classifying code [00] is determined by the previous processing in the step S7. Therefore, a pair of codes ([00], [10]) are stored in RAM 96.

The fact that the previous classifying code [ij] is determined means the fact that the operation is the second operation, i.e., the sticking operation of the pair of operations (operation set) composed of the detachment and the sticking. In an inverse viewpoint, the fact that the previous classifying code [ij] is not determined means the start of the new detachment and sticking operations, which means that the concerning operation is the detachment operation.

In the output processing described above, the geometric position-determining section 114 and the attribute area-determining section 116 are operated as follows. That is, it is confirmed that the transition from the code [00] to the code [10] has occurred with reference to the classifying table 210 on the basis of the pair of codes ([00], [10]). Therefore, the concerning attribute information (for example, the fire) is outputted as the attribute information output Qd by making reference to the magnet position-correlated attributed magnet-accommodating area storage section 118 on the basis of the magnet position stored upon the generation of the code [00]. Further, the concerning map position information (for example, the A town area 20A) is outputted as the map position information output (position information)

Qc by making reference to the magnet position-correlated map position information storage section 120 on the basis of the magnet position stored upon the determination of the code [10]. During this process, the communication time determined in the step S9 is outputted in combination. The communication time output Qb, the map position information output Qc, and the attribute information output Qd are stored, for example, in the hard disk 109 in the correlated manner.

Accordingly, as shown in FIG. 15, for example, the display is automatically made in a form of "communication time: February 4, 10:25 a.m., place of accident (occurrence) of disaster: A town, content: fire" on the monitor 48 of the personal computer 16 and (or) as the hard copy 50 of the printer 19.

Subsequently, in the step S11, the pair of codes ([00], [10]) described above are erased from RAM 96, and the routine returns to the process for monitoring the variation of the integral value Si in the step S2.

As explained above, according to the foregoing embodiment, the integral values Si, which are based on the induced electromotive forces E generated in the coils 54, 56 wound in the vertical direction and in the horizontal direction around the magnetic plate 52 for constructing the information input board 12, are used to detect the sticking/detachment operation for the magnet 31 on the information input board 12 and detect the sticking/detachment position.

Further, the sticking/detachment operation, which is performed for the magnet 31 on the information input board 12, is classified to determine the attribute (meaning) concerning the sticking/detachment operation for the magnet 31. Specifically, when the magnet 31 is detached in accordance with the first operation, it is judged whether the detachment position is disposed in the magnet-accommodating area 24 or in the map display area 22. Subsequently, when the detached magnet 31 is stuck in accordance with the second operation, it is judged whether the sticking position is disposed in the magnet-accommodating area 24 or in the map display area 22. Thus, the attribute (meaning) concerning the sticking/detachment operation for the magnet 31 is determined.

As described above, according to the foregoing embodiment, the position and the attribute of the magnet 31 existing on the information input board 12 can be reproduced by means of the internal processing executed by the personal computer 16 by measuring and processing the induced electromotive force E of the magnet 31. Further, it is easy to correspond the position information (attribute information) of the magnet 31 to the map information thereof.

Next, explanation will be made for the countermeasure adopted for any erroneous operation performed by the operator or for any erroneous operation caused when erroneous information is inputted due to electric noise or the like generated by any cause in the information input/output system 10 described above.

When the predetermined outputs Qb, Qc, Qd are obtained in the step S10, an unillustrated voice synthesizer, which is provided in the personal computer 16, is used to output, with voice from a speaker or the like, the output results of the communication time, the place, and the content of the attribute, for example, "Occurrence of fire in A town at 10:25 a.m. on February 4".

If the voice output is confirmed by the operator, and it is judged to be correct information, then an unillustrated "confirmation switch (OK switch)" is depressed. If the voice output is judged to be erroneous information, a "cancellation switch (cancel switch)" is depressed. Thus, the information can be confirmed or canceled.

If the cancel switch is depressed, a voice output such as "The magnet just moved cannot be recognized. Return the magnet to its original place." is generated. Accordingly, for example, the operator may perform the detachment/sticking operation for the magnet 31 again after detaching the stuck magnet 31 and sticking it on the original position. In such a case, the operation, which is performed during the process to return the magnet 31 to its original place, is recognized as a cancel operation by the software of the personal computer 16, and it can be distinguished from the operation to input the data.

As explained above, according to the present invention, the following effects are achieved. That is, the position of the magnet can be known on the magnetic plate by using the simple system, and the attribute information of the magnet can be known as the data.

When the sheet member is attached onto the magnetic plate to be used as the so-called writing board as well, the position of the magnet (the detachment position and the sticking position) can be known on the writing board. Further, the attribute information of the magnet can be known as the data by previously providing the attributed magnet-accommodating area on the writing board.

The information is inputted or displayed on the writing board by utilizing the magnet. Therefore, the following effects are achieved. That is, the operation of the system of the present invention is easy as compared with the conventional system which is based on the use of the marker or the like. Further, the system of the present invention has the excellent ability to recognize the information.

Furthermore, the amount of information to be processed is small as compared with the conventional technique in which characters or the like depicted on the electronic blackboard are recognized as bitmap information. As a result, it is possible to decrease the load on the computer to perform, for example, the recording, the processing, and the communication. In other words, it is easy to obtain the high speed operation, for example, for the recording, the processing, and the communication.

Moreover, for example, the information, which is inputted and displayed by using the magnet, is inputted as the information which is comprehensible for the computer. Therefore, a possibility is obtained in that a proper and quick countermeasure can be effected in accordance with the information processing executed by the computer, for example, when any disaster occurs.

In general, it is considered to be effective to mitigate the disaster that the situation of received damage is processed by the computer to execute an appropriate process upon the occurrence of disaster. However, the conventional technique involves a bottleneck of the way of input of the situation of received damage. According to the present invention, the bottleneck can be dissolved by using the simple arrangement.

It is a matter of course that the present invention is not limited to the embodiments described above, which may be embodied in other various forms without deviating from the gist or essential characteristics of the present invention.

What is claimed is:

1. A magnet-based information input apparatus comprising:

a magnetic plate provided with a plurality of coils wound therearound in a vertical direction and in a horizontal direction;

induced electromotive force-detecting sections connected to said plurality of coils respectively; and a magnet position-determining section to which outputs of said induced electromotive force-detecting sections are supplied, wherein:
when a magnet is stuck on said magnetic plate, a sticking coordinate position of said magnet is determined by using said magnet position-determining section on the basis of said outputs of said induced electromotive force-detecting sections.

2. A magnet-based information input apparatus comprising:
a magnetic plate provided with a plurality of coils wound therearound in a vertical direction and in a horizontal direction;
induced electromotive force-detecting sections connected to said plurality of coils respectively; and
a magnet position-determining section to which outputs of said induced electromotive force-detecting sections are supplied, wherein:
when a magnet is stuck on said magnetic plate, a sticking coordinate position of said magnet is determined by using said magnet position-determining section on the basis of said outputs of said induced electromotive force-detecting sections; and
when said magnet is detached from said magnetic plate, a detachment coordinate position of said magnet is determined by using said magnet position-determining section on the basis of said outputs of said induced electromotive force-detecting sections.

3. The magnet-based information input apparatus according to claim 1, further comprising a sheet member attached to cover said magnetic plate around which said plurality of coils are wound.

4. The magnet-based information input apparatus according to claim 2, further comprising a sheet member attached to cover said magnetic plate around which said plurality of coils are wound.

5. The magnet-based information input apparatus according to claim 3, wherein a plurality of attributed magnet-accommodating areas, which correspond to different attributes of information to be expressed by said magnets, are provided on said sheet member.

6. The magnet-based information input apparatus according to claim 4, wherein a plurality of attributed magnet-accommodating areas, which correspond to different attributes of information to be expressed by said magnets, are provided on said sheet member.

7. The magnet-based information input apparatus according to claim 3, further comprising:
a map display area provided on said sheet member;
a storage device for previously storing position information on said map and a coordinate position on said sheet member while making correspondence therebetween; and
a geometric position-determining section connected to said magnet position-determining section and said storage device, wherein:
said geometric position-determining section reads said position information on said map corresponding to said coordinate position with reference to said storage device on the basis of said coordinate position outputted from said magnet position-determining section.

8. The magnet-based information input apparatus according to claim 4, further comprising:
a map display area provided on said sheet member;
a storage device for previously storing position information on said map and a coordinate position on said sheet member while making correspondence therebetween; and
a geometric position-determining section connected to said magnet position-determining section and said storage device, wherein:
said geometric position-determining section reads said position information on said map corresponding to said coordinate position with reference to said storage device on the basis of said coordinate position outputted from said magnet position-determining section.

9. The magnet-based information input apparatus according to claim 8, further comprising:
a plurality of attributed magnet-accommodating areas provided on said sheet member, corresponding to said different attributes of information to be expressed by said magnets;
said storage device for previously storing position information concerning said plurality of attributed magnet-accommodating areas as coordinate positions on said sheet member while making correspondence to said respective attributes; and
an attribute area-determining section connected to said magnet position-determining section and said storage device, wherein:
when a desired magnet detached from said attributed magnet-accommodating area is stuck on a desired position on said map;
said attribute area-determining section reads attribute information concerning said detached desired magnet with reference to said storage device on the basis of a detachment coordinate position of said magnet outputted from said magnet position-determining section; and
said geometric position-determining section reads position information on said map concerning said stuck magnet with reference to said storage device on the basis of a sticking coordinate position of said magnet outputted from said magnet position-determining section.

10. The magnet-based information input apparatus according to claim 5, wherein said magnet itself includes display for making distinction for said attribute information.

11. The magnet-based information input apparatus according to claim 6, wherein said magnet itself includes display for making distinction for said attribute information.

12. The magnet-based information input apparatus according to claim 3, wherein said sheet member is used as a writing board.

13. The magnet-based information input apparatus according to claim 4, wherein said sheet member is used as a writing board.

14. The magnet-based information input apparatus according to claim 1, wherein said induced electromotive force-detecting section is composed of an integrating circuit.

15. The magnet-based information input apparatus according to claim 2, wherein said induced electromotive force-detecting section is composed of an integrating circuit.

* * * * *